United States Patent [19]
Rambauske et al.

[11] 3,841,737
[45] Oct. 15, 1974

[54] LAMINATED MIRROR

[75] Inventors: Werner R. Rambauske, Carlisle; John J. Grabowski, Andover, both of Mass.

[73] Assignee: Raytheon Company, Lexington, Mass.

[22] Filed: July 3, 1972

[21] Appl. No.: 268,271

[52] U.S. Cl. .................. 350/288, 350/310, 117/35
[51] Int. Cl. ............................................. G02b 5/08
[58] Field of Search ....... 350/288, 310, 320; 117/35

[56] References Cited
UNITED STATES PATENTS

| | | | |
|---|---|---|---|
| 2,425,022 | 8/1947 | Bart | 350/310 |
| 3,497,377 | 2/1970 | Allingham | 350/288 X |
| 3,609,589 | 9/1971 | Hufnagel | 350/310 X |
| 3,645,608 | 2/1972 | Staley et al. | 350/310 |

*Primary Examiner*—David Schonberg
*Assistant Examiner*—Michael J. Tokar
*Attorney, Agent, or Firm*—Philip J. McFarland; Joseph D. Pannone

[57] ABSTRACT

A mirror, and method of making same, is disclosed. The mirror includes a metallic base material having a low coefficient of thermal expansion, an intermediate layer bonded to the base by a plasma spray process and a reflecting surface overlying the intermediate layer, the coefficients of thermal expansion of the materials of the intermediate layer and the reflecting surface differing from each other and from the coefficient of thermal expansion of the base material.

6 Claims, 1 Drawing Figure

PATENTED OCT 15 1974    3,841,737
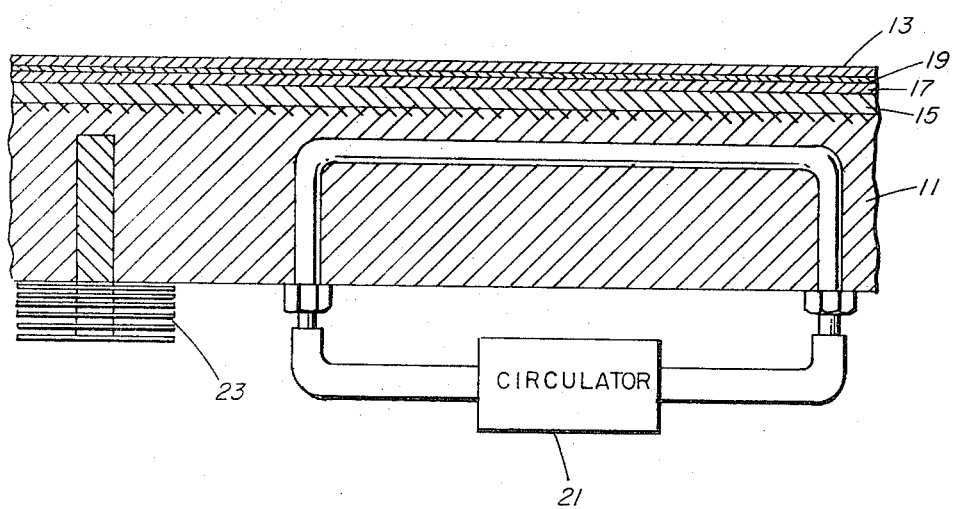

LAMINATED MIRROR

BACKGROUND OF THE INVENTION

This invention pertains generally to catoptric lens arrangements and particularly to such types of arrangements having lens elements with focal points spaced from the lens axis.

It is now known in the art that so-called "confocal" catoptric lens arrangements, i.e., arrangements incorporating reflecting surfaces corresponding to the curved surface generated by nutating selected quadratic conic sections about a lens axis, combine many desirable qualities. Reflecting surfaces so generated characteristically possess image points on a circle, or an arc of a circle, centered on an axis rather than a single point as in the usual case. Thus, by judiciously selecting particular conic sections for the generatrices of the reflecting surfaces of the elements of a catoptric lens arrangement, it is possible to design such an arrangement to be diffraction-limited with an extremely large aperture. It follows, then, that the f-number of such a lens arrangement may be far less than 1. Such a characteristic, in turn, means that radiant energy from a point source may, if desired, be focused within a very small circle of confusion; as a matter of fact, focusing may take place within a circle of confusion with a diameter in the same order as the wavelength of radiant energy. Alternatively, if desired, an almost perfectly collimated beam of radiant energy may be formed from radiant energy from a point source, because the diffraction effects suffered by such a catoptric lens arrangement are very small.

It is evident that confocal catoptric lens arrangements are particularly well suited for applications in which conventional refractive lens arrangements are, for one reason or another, not satisfactory. For example, when the radiant energy to be focused or collimated is concentrated in an intense beam, as in the beam from a high-powered laser, a sufficient amount of such energy incident on a refractive lens arrangement is absorbed by the material from which the lens elements are fabricated (some type of glass, mica or other solid material ordinarily deemed to be totally transparent) thereby causing undue heating which distorts, or even destroys, the lens elements.

Although a catoptric lens arrangement is not as susceptible to damage from overheating because energy passing through such an arrangement is almost completely reflected by the mirror surfaces of the lens elements, there is, however, a slight amount of energy absorbed by each lens element to cause heating. Therefore, especially when it is necessary to combine beams from more than a single high powered laser, even catoptric lens arrangements may be unduly heated. There simply is no known way of making the reflecting surface of lens elements in a catoptric lens arrangement to provide reflecting surfaces which are certain to withstand the enormous concentrations of energy resulting from the use of several high power lasers. Further, with any catoptric lens arrangement not using confocality principles, appreciable aperture blockage must be tolerated in order to arrange the lens elements in proper relative position with respect to each other.

It has been proposed to carry out thermal nuclear fusion by combining the beams from a number of high powered lasers in such a manner that the energy in each beam is focused on a small target. It is possible in such a system to obtain a flux density at the target which is sufficiently high to initiate the fusion reaction. That is, a flux density in the order of $10^{14}$ to $10^{16}$ watts per square centimeter may be attained. When energy with a flux density of such intensity is attained, a concomitant light pressure (in the order of the pressure required to contain the expanding plasma resulting from a nuclear reaction) is generated. Obviously, however, successful containment of an expanding plasma from a real specimen undergoing fusion requires that the light pressure be applied over a continuous finite area. In other words, any lens arrangement suited to the purpose must be capable of forming an "optical bottle."

In the design of optical radars it would be highly desirable to combine beams from several lasers into a composite beam, thereby to increase the effective range of the system. Again, in such an application conventional lens arrangements are inadequate for the basic reason that it is almost impossible to collimate energy from more than one source into a single beam. Using conventional lens elements, which have their focal points on a lens axis, in practice only one laser beam may be collimated by any particular known lens arrangement.

SUMMARY OF THE INVENTION

Therefore, it is a primary object of this invention to provide an improved mirror, and method of making same, adapted to withstand high flux densities without damaging its optical qualities.

Another object of this invention is to provide an improved mirror especially well adapted for use in the infrared portion of the electromagnetic spectrum.

Still another object of this invention is to provide an improved mirror having a reflective surface which is highly resistant to tarnishing.

These and other objects of this invention are attained generally in a preferred embodiment by bonding a primary intermediate layer of tungsten carbide with a cobalt binder to a base formed as a mirror blank, the base being a nickel-iron alloy having a low coefficient of thermal expansion and the bonding of the primary intermediate layer being accomplished by a plasma spray process. Additional intermediate layers of copper and silver are then applied to the primary intermediate layer after it is machined and a reflecting surface of gold is finally applied. The base preferably is honeycombed, without affecting its structural integrity, so as to permit incorporation of different types of forced cooling means so as to permit incorporation of different types of forced cooling means. For example, the base may have formed in it cooling coils through which a liquid or gaseous refrigerant may be passed or, alternatively, may have the pores of the honeycomb filled with a highly conductive material as copper to conduct heat to a heat sink.

BRIEF DESCRIPTION OF THE DRAWING

For a more complete understanding of this invention, reference is now made to the drawing, the single FIGURE of which is a cross-sectional view, somewhat simplified, of a finished mirror, the thicknesses of the various materials not being to scale for purposes of illustration.

DESCRIPTION OF THE PREFERRED EMBODIMENT

Referring now to the drawing, it may be seen that a finished mirror made according to this invention comprises a base 11 on which a mirror surface 13 is supported by intermediate layers 15, 17, 19. The base 11 is cast from the alloy "Ni-Resist-Fe(5)" to provide one surface shaped generally to the contour of the finished mirror. "Ni-Resist-Fe(5)" has the following composition, by weight:

| | |
|---|---|
| Nickel | 34–36% |
| Carbon | 2.40% |
| Silicon | 1–2% |
| Manganese | 0.40–0.80% |
| Chromium | 0.17% |
| The remainder iron | |

After casting, the surface of the base 11 is machined in any conventional manner to form a mirror blank. This is, the surface of the base 11 is machined so that its contour matches the contour of the finished mirror, with proper allowance being made for the thickness of the intermediate layers 15, 17, 19 and of the mirror surface 13 (if the finished mirror is to be curved). The surface of the base 11 is coated with a relatively thick layer of tungsten carbide with a cobalt binder by a plasma spray process. In such a process, an electrode (fabricated, for example, from (by weight) tungsten carbide, 85 percent, and a cobalt binder, 15 percent, designated LW–1N40 by Union Carbide Corporation, New York, N.Y. is centered in a tubular water-cooled nozzle (not shown) having a constricted tip. When a gas, as acetylene, is introduced to the nozzle and a DC voltage of, say 250 volts, is applied between the base 11 (as the anode) and the tungsten electrode (as the cathode) an arc may be struck between the base 11 and the tungsten electrode, such arc containing ions of the electrode material. Then, by properly adjusting the travel of the nozzle by moving either the base 11 or the nozzle over the surface of the base 11, the ions from the electrode in the arc may be distributed over the surface of the base 11 to form an overlying layer of the electrode material approximating the desired primary intermediate layer 15. It has been found that the ions in the plasma spray first penetrate the surface of the base 11 and then are built up to a thickness of, say, 0.010 to 0.015 inches as the plasma spray is moved relative to the base 11. Obviously, then, such an intimate contact is made that the primary intermediate layer 15 is firmly bonded to the base 11. In operation, therefore, even though there may be a substantial difference between the coefficient of thermal expansion of the material in the intermediate layer 15 and the material in the base 11, the temperature gradient through the primary intermediate layer 15 to the base 11 is reduced to an insignificant amount. As a result, thermally induced stresses between the base 11 and the primary intermediate layer 15 are practically eliminated. The primary intermediate layer 15 (which has the machining characteristics of tungsten carbide, may be contoured as desired by grinding to its required shape (allowance being made for the remaining intermediate layers and the reflecting surface).

The intermediate layer 17 is formed by electrolytically depositing copper on the primary intermediate layer 15. The contour of the exposed surface of the intermediate layer 17 then follows the contour of the primary intermediate layer 15. Because of the high thermal conductivity of copper, the intermediate layer 17 practically eliminates thermally induced shear forces between the intermediate layer 15 and the actual reflecting surface.

When, as here, the finished mirror is to be used to reflect optical energy in the infrared portion of the electromagnetic spectrum, the mirror surface 13 preferably is gold. In order to inhibit migration between the copper of the intermediate layer 17 and the gold in such a mirror surface, the exposed surface of the intermediate layer 17 is flashed with silver to form an intermediate layer 19. The mirror surface 13 is then formed by depositing, in any convenient manner, gold on the exposed surface of the intermediate layer 19.

It will now be evident that, once the primary intermediate layer 15 is bonded to the base 11 and contoured as required, changes in construction may be made to form elements for different applications. Thus, if the finished mirror is intended for use in applications in which thermal shocks are not to be experienced, the intermediate layer 17 is not absolutely required. Further, if the finished mirror is intended to be used to reflect optical energy in the visible range, rhodium, silver, aluminum or beryllium may be used in place of gold for the mirror surface.

The base 11, although it may be a solid cast unit, preferably is honeycombed. This type of structure reduces the weight of the finished mirror without adversely affecting its structural integrity. Further, forced cooling may then be incorporated in the base 11. Thus, for example, a circulator 21 (as a compressor and a condenser) may be connected as shown to pass a refrigerant through an evaporator (here a coil, not numbered,) embedded in the base 11. Alternatively, holes in the base 11 may be filled with a highly conductive material, as copper, to conduct heat in the base 11 to a heat sink 23.

Having described a reflective mirror according to this invention and a way in which such a mirror may be formed, it will now be apparent that the exact shape and dimensions of mirrors of the type herein contemplated may be changed without departing from the spirit of our inventive concepts.

Further, having once formed a primary intermediate layer on a base in the manner described, interference coatings rather than reflective coatings may be applied. It is felt, therefore, that this invention should not be restricted to its disclosed embodiment, but rather should be limited only by the scope of the appended claims.

What is claimed is:

1. A mirror comprising:
   a. a metallic base having one surface thereof optically smooth and contoured to correspond with the shape desired for the reflecting surface of the mirror;
   b. a primary intermediate metallic layer fused to the optically smooth surface of the metallic base, the material of such layer having a higher coefficient of thermal expansion than the material of such base; and
   c. a reflecting surface overlying the primary intermediate layer.

2. A mirror as in claim 1 comprising additionally:
   a. a secondary intermediate layer deposited electrolytically on the primary intermediate metallic layer, the material of such secondary layer being copper; and, b. a tertiary layer overlying the secondary intermediate layer, the material of such tertiary layer being silver.

3. A mirror as in claim 2 wherein:
a. the material of the base is an alloy of nickel (35 percent) and iron; and
b. the material of the primary intermediate metallic layer is tungsten carbide with a cobalt binder.

4. A mirror as in claim 3 wherein the material of the base is honeycombed.

5. A mirror as in claim 4 wherein at least some of the cells in the honeycombed base are filled with copper.

6. A mirror as in claim 4 having, additionally, means for passing a coolant through at least some of the cells in the honeycombed base.

* * * * *